United States Patent [19]

Turnbull

[11] 3,775,663
[45] Nov. 27, 1973

[54] INVERTER WITH ELECTRONICALLY CONTROLLED NEUTRAL TERMINAL

[75] Inventor: Fred G. Turnbull, Scotia, N.Y.

[73] Assignee: General Electric Company, Schenectady, N.Y.

[22] Filed: Aug. 24, 1972

[21] Appl. No.: 283,530

[52] U.S. Cl. .............................. 321/9 A, 321/45 R
[51] Int. Cl. ............................................. H02m 7/52
[58] Field of Search ...................... 321/5, 9 A, 27 R, 321/45 R

[56] References Cited
UNITED STATES PATENTS
3,461,373  8/1969  Mokrytzki .......................... 321/9 A
3,648,150  3/1972  Kernick et al. ..................... 321/9 A Primary Examiner—A. D. Pellinen
Attorney—John F. Ahern et al.

[57] ABSTRACT

A solid state inverter, or other single phase or polyphase power converter, has an electronic neutral to enable direct connection to unbalanced loads without requiring a fundamental frequency output transformer. The electronic neutral terminal circuit is typically an additional single phase inverter operated as a current source or sink to maintain the potential at the neutral terminal at a controlled voltage independent of neutral current flow into and out of the neutral terminal. The preferred embodiment is a three-phase pulse width modulated inverter supplying single phase and polyphase unbalanced loads.

10 Claims, 3 Drawing Figures

INVERTER WITH ELECTRONICALLY CONTROLLED NEUTRAL TERMINAL

BACKGROUND OF THE INVENTION

This invention relates to solid state power converters with an electronic neutral terminal. More particularly, the invention relates to inverters having a neutral output terminal at an electronically controlled potential for direct connection to unbalanced loads and certain balanced loads without requiring an output transformer.

Polyphase inverters used to convert unidirectional voltage to polyphase alternating voltage, such as the common three-phase static inverter, are required for certain applications to have a three-phase, four-wire output. In addition to the requirement that the inverter have a neutral terminal for the fourth wire, a problem arises with unbalanced polyphase loads and single phase loads in that the inverter must maintain the neutral terminal at the correct potential. Due to the difficulty or inability of doing this, it has heretofore been the practice to utilize a conventional inverter with three output terminals and a polyphase output transformer connected, for example, delta on the inverter side and wye on the load side. Although the neutral transformer terminal is undisturbed by unbalanced loads, the transformer operates at 60 Hz or some other power frequency and therefore is usually bulky and relatively expensive.

SUMMARY OF THE INVENTION

In accordance with the invention, appropriately selected inverters and other power converters are provided with an electronic neutral by the addition of an electronic neutral terminal circuit that is operative to control the neutral potential independent of any neutral current flow. In the case of a three-phase inverter, for example, there is neutral current flow when a single phase load or an unbalanced polyphase load is connected directly between the appropriate inverter output terminals and the neutral terminal. The electronic neutral terminal circuit is typically an additional single phase inverter connected between the direct voltage input terminals and operated to maintain the potential at the neutral terminal at a controlled voltage while functioning as a current source and sink. In its broader scope, a power converter with an electronically controlled neutral can also be used with balanced loads. Although there is then no neutral current, the additional inverter is operated to modulate the neutral terminal potential, rather than keep it constant at the neutral of the d-c supply voltage, to obtain the desired load voltage by summation with the voltage applied at the other output terminals.

The embodiment disclosed is a three-phase pulse width modulated inverter in which each of the phase inverters as well as the electronic neutral terminal circuit inverter are constructed in the half-bridge configuration. All of the half-bridge inverters are controlled at a high frequency chopping rate. Suitable a-c filtering can be provided but is not essential. By operating the electronic neutral terminal circuit inverter so that each switch in a high frequency chopping cycle has equal intervals of conduction, the filtered potential at the neutral terminal is midway between the d-c input terminal voltages assuming no neutral current. When there is neutral current flow due to an unbalanced load, the intervals of conduction of the switches are modulated to supply the required neutral current or return neutral current to the source while maintaining the neutral terminal potential at the midway value. A modification of the invention employs only two inverter phases in addition to the electronic neutral terminal circuit for connection as a single phase, three-wire circuit with unbalanced loads or as a two-phase circuit with unbalanced loads.

DESCRIPTION OF THE PREFERRED EMBODIMENTS

Figure 1:
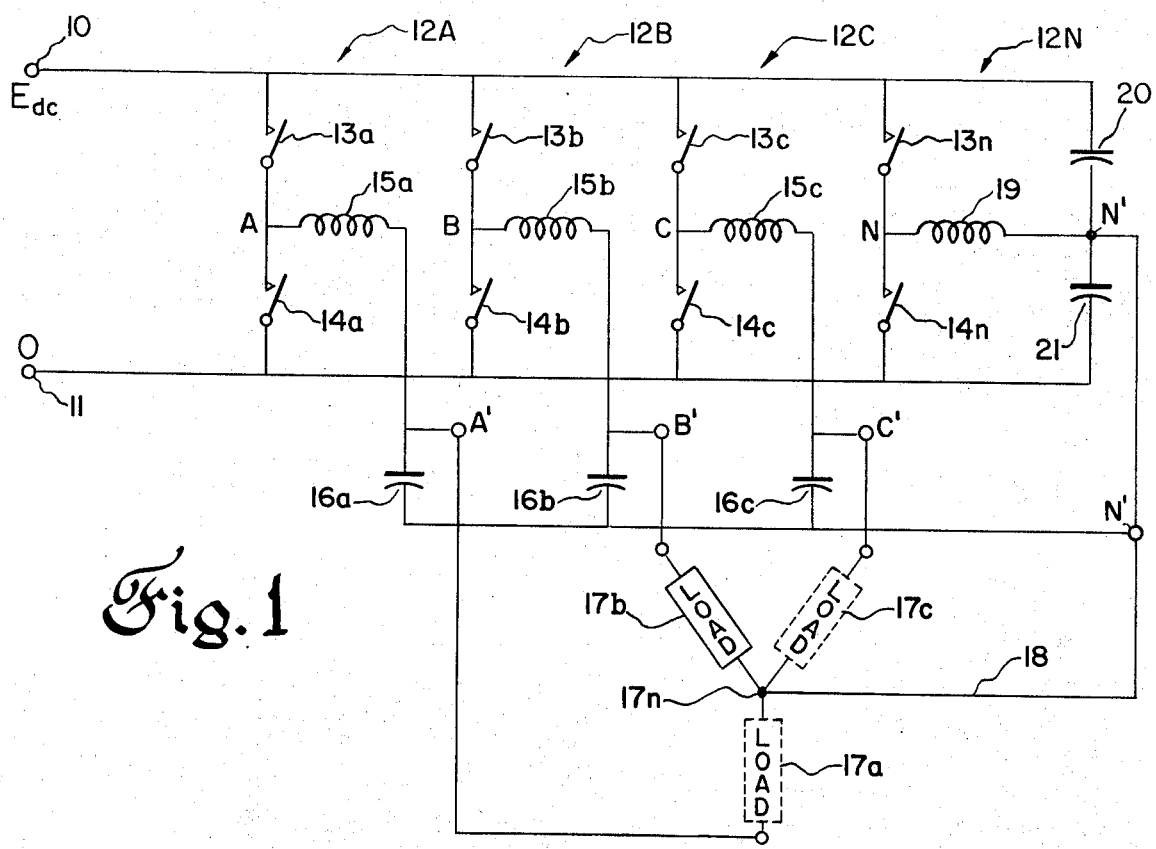
FIG. 1 is a simplified schematic circuit diagram of a three-phase pulse width modulated inverter constructed in accordance with the invention to include an electronic neutral terminal circuit to enable supplying single phase and unbalanced polyphase loads.

To illustrate the principles of the invention, the three-phase inverter shown in simplified form in FIG. 1 is a pulse width modulated (PWM) inverter with a three-phase, four-wire output suitable for the direct connection of unbalanced loads. A d-c input voltage $E_{dc}$ is provided between inverter input terminals 10 and 11, which are adapted to be connected to a battery, a rectifier energized by commercially available alternating voltage, or some other source of unidirectional voltage. The inverter is more particularly constructed in the full wave bridge configuration, and has three identical phases 12A, 12B, and 12C, each of which is a single phase half-bridge inverter.

Figure 3:
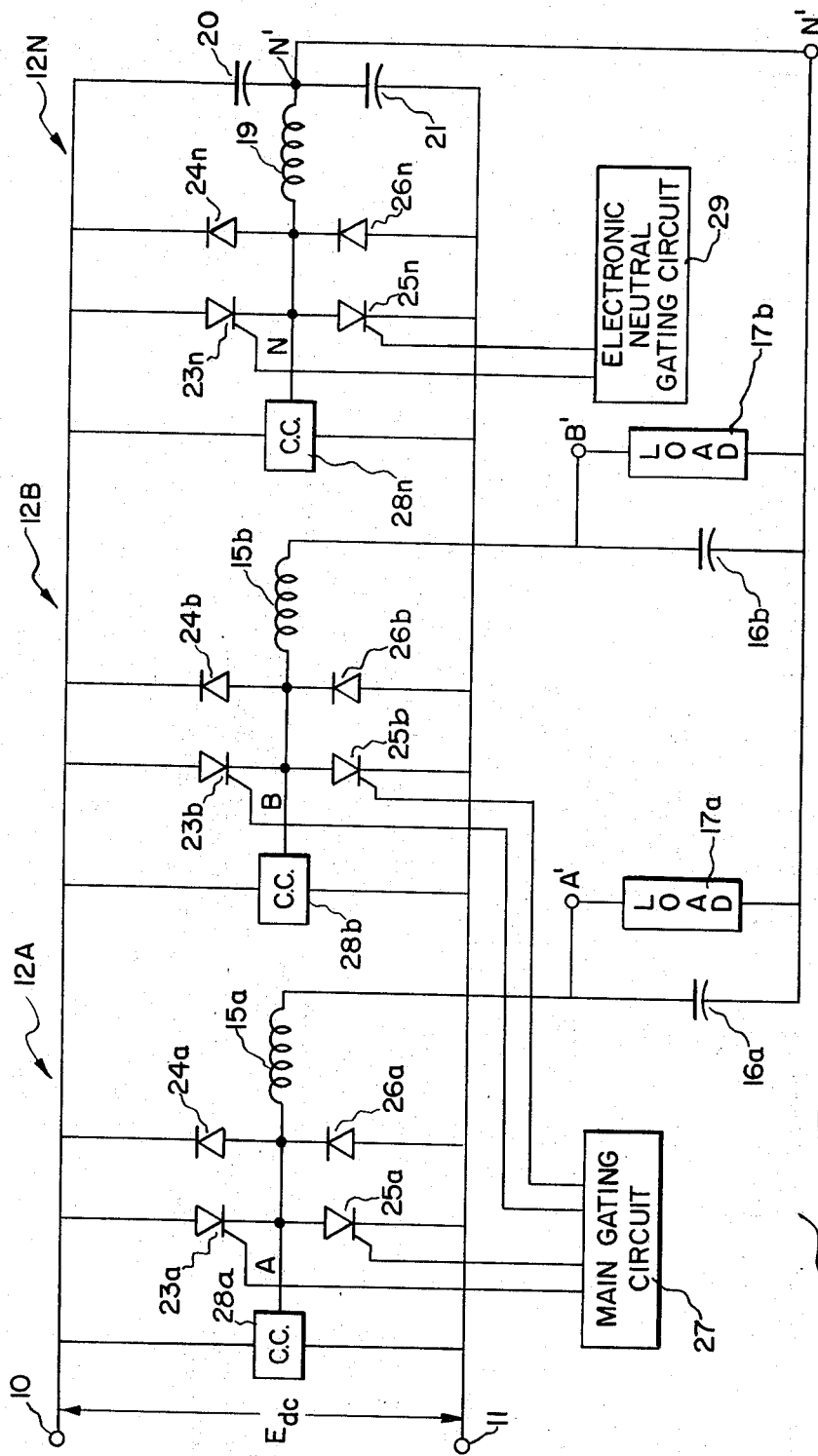
FIG. 3 is a detailed circuit diagram of a modification of FIG. 1 having only two inverter phases for use with single phase and unbalanced two-phase loads.

In phase 12A, a pair of alternately conducting solid state switches 13a and 14a, shown here as simple switches, are connected in series between input terminals 10 and 11. A variety of solid state power devices can be used, including transistors and thyristors, with either unidirectional or bidirectional conducting characteristics depending upon the circuit requirements. The inverse-parallel combination of a silicon controlled rectifier and a diode, with appropriate commutating and gating circuits as shown in FIG. 3, can also be used in FIG. 1 but are omitted for the sake of clarity. The feedback diode is needed for reverse current flow when the load is a reactive or regenerative load. The square wave generated at the junction point A between switches 13a and 14a is filtered by an a-c filter network comprising a series input filter inductor 15a and a shunt filter capacitor 16a connected to point A and the output neutral terminal N'. The output terminal A' for inverter phase 12A, of course, is taken at the junction between filter inductor 15a and filter capacitor 16a. Assuming that switches 13a and 14a are operated at a high chopping frequency with sine wave modulation of the pulse widths, the output voltage at output terminal A' is sinusoidal. Corresponding components in the identical inverter phases 12B and 12C are designated by the same numerals with a b or c suffix. The wye-connected three-phase load 17a, 17b, 17c is connected in conventional fashion between the respective output terminals A', B', and C' and the neutral output terminal N'. For a balanced three-phase load and the proper phase displacement between the individual sine wave output voltages at output terminals A', B', and C', the average voltage at neutral terminal N' is $E_{dc}/2$ and there is no current flow in the neutral conductor 18 making connection between terminal N' and the neutral junction point 17 n in the load.

In order to supply unbalanced polyphase loads and single phase loads there is provided, in accordance with the invention, an electronic neutral terminal circuit 12N for controlling the potential at output neutral terminal N'. The usual function of electronic neutral terminal circuit 12N is to enable current flow into and out of terminal N' to supply the unbalanced polyphase load or single phase load without affecting the potential at terminal N'. In effect, circuit 12N provides a controllable current source or sink for neutral current at a controllable voltage. In terms of circuit structure, electronic neutral terminal circuit 12N is comprised by an additional single phase inverter connected between input terminals 10 and 11 that is preferably identical to the inverters in phases 12A, 12B, and 12C. Accordingly, a half-bridge inverter is provided and is comprised by the series connected solid state switches 13n and 14n which may have unidirectional or bidirectional conducting characteristics depending upon the circuit requirement and are preferably identical to the corresponding switches in the phases supplying line voltage. A preferred arrangement, it is recalled, is the inverse-parallel combination of a silicon controlled rectifier and a diode. The filter network connected to the junction point N between switches 13n and 14n includes, similarly, a series input filter inductor 19 whose other end is connected directly to neutral terminal N', and a pair of shunt filter capacitors 20 and 21 respectively connected between input terminals 10 and 11 and neutral terminal N'. With this arrangement, it is seen that alternately rendering conductive switches 13n and 14n for equal intervals maintains the potential at neutral terminal N' at one-half the supply voltage, i.e., $E_{dc}/2$.

Figure 2:
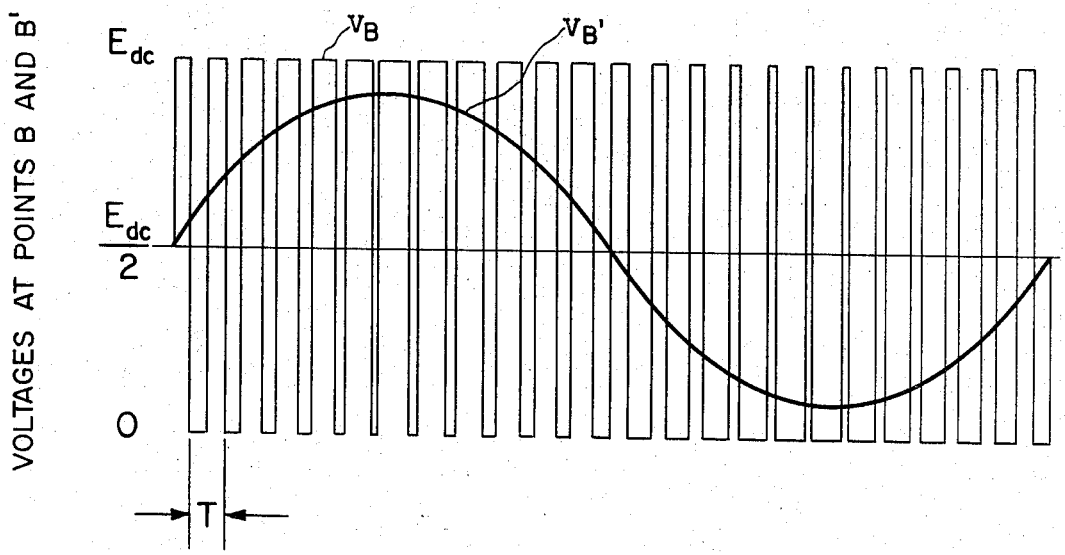
FIG. 2 is a waveform diagram of the instantaneous voltages in one inverter phase at the junction of the solid state switches and at the output terminal after a-c filtering.

To explain the operation of a pulse width modulated inverter with an electronically controlled neutral terminal as herein taught, it is assumed that the load is resistive and that only the single phase load 17b is connected. Consequently, only inverter phase 12B and electronic neutral terminal circuit 12N are supplying load current. As has been mentioned, switches 13b and 14b are turned on and off, one always being closed, at a chopping frequency that is relatively high as compared to the fundamental frequency of the sinusoidal output voltage. As is shown in FIG. 2, the instantaneous voltage $v_B$ at the junction point B is a square wave voltage with the period T. By sinusoidally modulating the on-off ratio of the intervals of conduction of switches 13b and 14b, the illustrated pulse width modulated waveform is obtained at point B. During the positive half cycle of the filtered instantaneous output voltage $v_{B'}$, the intervals of conduction of switch 13b are gradually increased and then decreased. The current flowing through load 17b is, of course, in phase with the fundamental frequency instantaneous output voltage $v_{B'}$ 4. This positive sinusoidal current also flows through neutral conductor 18 into neutral terminal N'. If switches 13n and 14n were operated at a high chopping frequency such that the ratio of one-to-off time of the switches is equal to unity, assuming no neutral current, then the potential at point N' is one-half the supply voltage. With neutral current flowing into point N', as is the case here, the excess current is removed from point N' without disturbing the potential by increasing the conduction time of switch 14n and correspondingly decreasing the conduction time of switch 13n. To return sinusoidal neutral current to negative d-c terminal 11, switches 13n and 14n are operated to produce a sinusoidally modulated square wave waveform at point N such as that shown in the second half of FIG. 2. Thus, electronic neutral terminal circuit 12N functions as a current sink while maintaining the neutral voltage $E_{dc}/2$ at neutral terminal N'.

During the negative half cycle of the filtered voltage applied to load 17b, the intervals of conduction and nonconduction of switches 13b and 14b are sinusoidally modulated such that switch 14b is increasingly conductive, and then decreasingly conductive. The pulse width modulated waveform at point B consequently always has an average value lower than $E_{dc}/2$. Neutral current now flows out of neutral terminal N', and therefore electronic neutral terminal circuit 12N must function as a current source. In each high frequency chopping circuit of the switches 13n and 14n, the sinusoidally modulated intervals of conduction of switch 13n predominate. Accordingly, electronic neutral terminal circuit 12N supplies current to neutral terminal N' to balance the neutral current withdrawn to supply the load without thereby changing the potential at neutral terminal N'. The same principles apply when the single phase load 17b is a reactive load or a regenerative load, although in this case, the load voltage and current are not in phase. An unbalanced polyphase load, either two-phase or three-phase, produces a predictable neutral current in neutral conductor 18. The on-off time ratio of switches 13n and 14n is appropriately programmed such that electronic neutral terminal circuit 12N supplies the required unbalanced current without affecting the potential at neutral terminal N'.

For certain load conditions, a-c filtering of the output voltages at output terminals A', B', and C' may not be required, as for example, when the load provides its own filtering. In this case, the various filter networks in each of the inverter phases and in electronic neutral terminal circuit 12N are not provided, and the load is connected directly to points A, B, C, and N, or an appropriate combination of these.

Another modification is that the inverter with an electronically controlled neutral terminal as shown in FIG. 1, with a-c filter components, can be used with a balanced polyphase load in a mode in which the potential at neutral terminal N' is deliberately controlled to be above or below $E_{dc}/2$. In balanced load conditions, there is no neutral current in neutral conductor 18. By increasing the ratio of conduction of switch 13n relative to switch 14n, the potential at terminal N' is higher than $E_{dc}/2$, and vice versa when switch 14n conducts for longer intervals than switch 13n. The voltage applied to the load is then the sum of the voltages applied by inverter phases 12A, 12B, and 12C, and the voltage applied by electronic neutral terminal circuit 12N. For instance, it is possible to inject a harmonic voltage signal in conjunction with the d-c voltage signal of one-half of the d-c supply voltage into the control of the switches connected to point N in order to reduce certain undesired harmonic voltage components from the load, such as the third harmonic. In this case, the inverter phases are controlled to provide a flat-topped sinusoidal wave rather than a pure sine wave. Electronic neutral terminal circuit 12N is controlled to produce a third harmonic voltage signal modulated about $E_{dc}/2$. The sum, which is the voltage applied to the balanced three-phase load, is then a sinusoidal wave. This mode of operation is advantageous under certain conditions.

The detailed circuit diagram shown in FIG. 3 is a two-phase version or a single phase, three-wire version of the three-phase pulse width modulated inverter of FIG. 1. This inverter configuration is suitable for single phase loads and unbalanced two-phase loads, and can also be operated as a single phase converter that is equivalent to a center-tapped transformer with either one or two single phase loads connected between the neutral and either end of the transformer winding. Referring to inverter phase 12A, the previously mentioned preferred solid state switches are illustrated, namely, the inverse-parallel combination of an SCR 23a and a feedback diode 24a connected between point A and positive input terminal 10, and the inverse-parallel SCR 25a and feedback diode 26a connected between point A and negative input terminal 11. This arrangement of switches allows current flow out of and into terminals A and A' from the load. Main gating circuit 27 supplies properly timed gating signals to SCR's 23a and 25a, and also to the corresponding SCR's 23b and 25b in inverter phase 12B. Suitable gating circuits that can be used are described, for example, in the SCR Manual, 5th Edition, published by the General Electric Company, copyright 1972. Assuming that a sinusoidal load voltage is desired, the timing of the gating signals supplied by main gating circuit 27 is selected to obtain at point A a sinusoidally modulated square waveform of the type shown in FIG. 2. An appropriate commutating circuit 28a, such as one of those described in the SCR Manual, is provided to commutate off the SCR's 23a and 25a at the end of the selected intervals of conduction. The electronic neutral terminal circuit 12N is similarly provided with a corresponding arrangement of switches. SCR 23n and feedback diode 24n are connected between junction point N and positive d-c input terminal 10 while SCR 25n and feedback diode 26n are connected between point N and negative d-c input terminal 11. A properly programmed electronic neutral gating circuit 29 supplies gating signals to SCR's 23n and 25n, which are commutated off by commutating circuit 28n to terminate the intervals of conduction. Electronic neutral gating circuit 29 can be similar to main gating circuit 27, with the exception that the timing of the gating signals is selected as previously described to control the potential at neutral terminal N'. Since the FIG. 3 inverter operates essentially in the same manner as the FIG. 1 inverter, no further description of the operation is believed to be necessary.

Although the preferred embodiments have been discussed with regard to pulse width modulated inverters, the invention has general application to various single phase and polyphase inverter systems and other static converter systems with a neutral terminal to which unbalanced loads can be directly connected. As is known in the art, there are numerous classes of inverters other than those that employ the pulse width modulation principle, such as those with a variable d-c supply for voltage control, series and parallel capacitor-commutated inverters, and so on. Also, inverters can be constructed in other circuit configurations than the half-bridge configuration illustrated, for example, the center-tapped supply configuration, the three-phase half wave configuration, etc. Reference may be made to the book "Principles of Inverter Circuits" by Bedford and Hoft, John Wiley and Sons, Inc., copyright 1964, for further explanation. In appropriate cases the electronic neutral terminal technique as here taught is applicable to these other classes and configurations of inverters, and to multiphase systems with more than three phases, for instance, six, 12, and 24 phases. Because of the elimination of a fundamental frequency output transformer, which is often bulky and heavy, the instant inverters are especially advantageous for power conversion equipment in airplanes, trains, and other environments where light weight is desirable.

While the invention has been particularly shown and described with reference to several preferred embodiments thereof, it will be understood by those skilled in the art that the foregoing and other changes in form and details may be made therein without departing from the spirit and scope of the invention.

What I claim as new and desire to secure by Letters Patent of the United States is:

1. A power converter with an electronic neutral comprising
   a solid state inverter comprising a plurality of single phase inverters for independently supplying alternating voltage to a like number of output terminals that are directly connectable to a load, said inverter further having a neutral terminal that is directly connectable to the load, and
   an electronic neutral terminal circuit comprising an additional single phase inverter for supplying voltage to said neutral terminal,
   said electronic neutral terminal circuit being operative to control the potential at said neutral terminal independent of any neutral current flow into and out of said neutral terminal.

2. A power converter according to claim 1 for use with a balanced load producing negligible neutral current flow wherein
   said electronic neutral terminal circuit is operative to modulate the potential at said neutral terminal, whereby the alternating voltage supplied to said output terminals and the modulated potential at said neutral terminal are summed to apply a desired waveform to the balanced load.

3. A power converter with an electronic neutral comprising
   a solid state inverter comprising a plurality of single phase inverters for independently supplying alternating voltage to a like number of output terminals that are selectively directly connectable to an unbalanced load, said inverter further having a neutral terminal that is directly connectable to the unbalanced load,
   an electronic neutral terminal circuit comprising an additional single phase inverter for supplying said neutral terminal,
   said electronic neutral terminal circuit being operative selectively as a current source and current sink to control the potential of said neutral terminal independent of any neutral current flow into and out of said neutral terminal.

4. A power converter according to claim 3 wherein all of said single phase inverters are connected between a pair of direct voltage input terminals, and
said electronic neutral terminal circuit is operative to maintain the potential at said neutral terminal at an approximately constant average value.

5. A power converter according to claim 3 further including filter means for filtering the voltage at each of said output and neutral terminals.

6. A power converter according to claim 3 wherein said single phase inverters supplying said output terminals are selectively controlled at a high chopping frequency to generate pulse width modulated alternating voltage, and
said additional single phase inverter in said electronic neutral terminal circuit is controlled at a high chopping frequency.

7. A power converter according to claim 3 wherein said single inverters supplying said output terminals are half-bridge inverters connected between a pair of direct voltage input terminals, and filter means comprising a series filter inductor and shunt filter capacitor for filtering the voltage supplied to each output terminal, and
said additional single phase inverter in said electronic neutral terminal circuit is a half-bridge inverter connected between said input terminals, and filter means for filtering the voltage supplied to said neutral terminal comprising a series filter inductor connected to the junction of a pair of capacitors which in turn are connected in series between said input terminals.

8. A power converter with an electronic neutral comprising
a solid state inverter comprising at least three half-bridge inverters each connected between a pair of direct voltage input terminals and supplying alternating voltage to at least three output terminals that are selectively directly connectable to an unbalanced load, said inverter further having a neutral terminal that is directly connectable to the unbalanced load, and
an electronic neutral terminal circuit comprising an additional half-bridge inverter connected between said input terminals and supplying said neutral terminal,
said electronic neutral terminal circuit being operated as a current source and current sink to maintain said neutral terminal at an approximately constant potential independent of neutral current flow.

9. A power converter according to claim 8 wherein all of said half-bridge inverters are controlled at a high chopping frequency to generate pulse width modulated alternating voltage.

10. A power converter according to claim 9 further including filter means for filtering the pulse width modulated alternating voltage supplied to each output and neutral output terminal.

* * * * *